(12) United States Patent
Kono et al.

(10) Patent No.: US 10,060,476 B2
(45) Date of Patent: Aug. 28, 2018

(54) THRUST ROLLER BEARING CAGE AND METHOD FOR MANUFACTURING THE SAME

(71) Applicant: NTN CORPORATION, Osaka (JP)

(72) Inventors: Shingo Kono, Shizuoka (JP); Kazuyuki Yamamoto, Shizuoka (JP)

(73) Assignee: NTN CORPORATION, Osaka (JP)

( * ) Notice: Subject to any disclaimer, the term of this patent is extended or adjusted under 35 U.S.C. 154(b) by 25 days.

(21) Appl. No.: 15/109,885

(22) PCT Filed: Dec. 11, 2014

(86) PCT No.: PCT/JP2014/082828
§ 371 (c)(1),
(2) Date: Jul. 6, 2016

(87) PCT Pub. No.: WO2015/104946
PCT Pub. Date: Jul. 16, 2015

(65) Prior Publication Data
US 2016/0333936 A1    Nov. 17, 2016

(30) Foreign Application Priority Data

Jan. 10, 2014    (JP) .................................. 2014-003395

(51) Int. Cl.
*F16C 33/54* (2006.01)
*B21D 53/12* (2006.01)
(Continued)

(52) U.S. Cl.
CPC ............ *F16C 33/546* (2013.01); *B21D 53/10* (2013.01); *B21D 53/12* (2013.01); *F16C 19/305* (2013.01); *F16C 19/463* (2013.01); *F16C 33/541* (2013.01)

(58) Field of Classification Search
CPC .... F16C 19/305; F16C 19/463; F16C 33/541; F16C 33/543; F16C 33/546; B21D 53/12
See application file for complete search history.

(56) References Cited

U.S. PATENT DOCUMENTS 3,226,170 A * 12/1965 Neese .................... F16C 19/305
    384/623
3,240,543 A *  3/1966 Benson ................. F16C 19/305
    29/898.067
(Continued)

FOREIGN PATENT DOCUMENTS

CN           1826479       8/2006
CN          101835997      9/2010
(Continued)

OTHER PUBLICATIONS

Translation of JPH10220482 obtained Sep. 18, 2017.*
Translation of JP2006057742 obtained Sep. 21, 2017.*

*Primary Examiner* — James Pilkington
(74) *Attorney, Agent, or Firm* — Clark & Brody

(57) ABSTRACT

A thrust roller bearing cage (11) is a cage (11) provided to a thrust roller bearing and having a plurality of pockets (21) that house needle rollers (13). The cage (11) includes projections (44) that are formed by bending a radially outer area of the cage (11) inwardly along the radius and that project inwardly along the radius toward a radially outer area of the pockets (21) to make contact with end faces (16) of the rollers (13). The projections (44) have corners (45) that make contact with the end faces (16) of the rollers (13). The corners (45) are press-flattened.

9 Claims, 8 Drawing Sheets

(51) Int. Cl.
*B21D 53/10* (2006.01)
*F16C 19/30* (2006.01)
*F16C 19/46* (2006.01)

(56) References Cited

U.S. PATENT DOCUMENTS

| | | | |
|---|---|---|---|
| 8,448,430 B2 * | 5/2013 | Fukami | F16C 19/30 384/621 |
| 8,480,309 B2 | 7/2013 | Ince | |
| 2010/0058750 A1 * | 3/2010 | Fukami | F16C 19/30 60/330 |
| 2010/0086249 A1 | 4/2010 | Winkler et al. | |

FOREIGN PATENT DOCUMENTS

| | | |
|---|---|---|
| DE | 102008018291 | 12/2008 |
| DE | 102008050232 | 4/2010 |
| JP | 9-324817 | 12/1997 |
| JP | 10-220482 | 8/1998 |
| JP | 2003-21146 | 1/2003 |
| JP | 2006-57742 | 3/2006 |
| JP | 4706715 | 6/2011 |
| JP | 2011-144866 | 7/2011 |

* cited by examiner

THRUST ROLLER BEARING CAGE AND METHOD FOR MANUFACTURING THE SAME

TECHNICAL FIELD

This invention relates to thrust roller bearing cages (hereinafter, sometimes simply referred to as "cages") and methods for manufacturing the cages, and more particularly relates to a thrust roller bearing cage manufactured by using a press and a method for manufacturing the cage.

BACKGROUND ART

At any places where thrust loads are applied, for example, in automatic transmissions, air conditioner compressors, and other components in automobiles, thrust roller bearings for supporting thrust loads are placed on a case-by-case basis. Such thrust roller bearings are desired to reduce the running torque in order to improve fuel efficiency and power saving. A thrust roller bearing includes raceways arranged in the direction of the rotation axis, a plurality of needle rollers rolling on raceway surfaces of the raceways, and a cage retaining the needle rollers. Some cages are manufactured by bending a steel plate and then punching out pockets that house the rollers.

Technologies relating to the cages provided in thrust roller bearings are disclosed in Japanese Unexamined Patent Publication No. H10(1998)-220482 (PTL 1), and Japanese Patent No. 4706715 (PTL 2).

CITATION LIST

Patent Literature

PTL1: Japanese Unexamined Patent Publication No. H10 (1998)-220482
PTL2: Japanese Patent No. 4706715

SUMMARY OF INVENTION

Technical Problem

PTL 1 describes a thrust roller bearing cage that includes projecting portions projecting inwardly along the radius from end faces of pockets located radially outward of the annular cage body, and making contact with outer circumferential end faces of rollers. It is also described in PTL 1 that these projecting portions make contact with a nearly center part of the rollers to guide the rollers in the radial direction, thereby reducing the running torque of the bearing and improving the wear resistance of the cage. However, if such projecting portions are formed at improper positions, proper contact between the projecting portions and outer circumferential end faces of the rollers cannot be achieved, and therefore rolling movement of the rollers housed in the pockets may be impaired. In addition, PTL 1 discloses nothing about methods for forming the projecting portions.

PTL 2 describes a method for manufacturing a thrust roller bearing cage that includes forming projecting portions, which are used to pivotally support rollers on inner walls of pockets, while simultaneously punching out the pockets. According to the configuration, the projecting portions can be easily located in the pockets with high accuracy by only controlling the shape of a mold used for pocket punching, and also the number of processes for manufacturing the cage can be reduced in comparison with conventional examples.

However, the following problems are found in the method for manufacturing the thrust roller bearing cage in the PTL 2. The thrust roller bearing cage in the disclosure of PTL 2 is configured to include the projecting portions on the inner walls of the pockets to pivotally support the rollers. If the cage is thin, it may be difficult to take a countermeasure. Concretely speaking, in the case of housing small-diameter short rollers in pockets, for example, rollers having a diameter of less than φ3 mm, which is relatively small, and having a length/diameter ratio between the roller length and roller diameter of less than 2, the plate thickness of the cage must be made thinner than usual to achieve proper contact between the end faces of the rollers and the projecting portions. This countermeasure may lead to a significant reduction in the strength of the cage. Consequently, the technique disclosed in PTL 2 may create problems when using the small-diameter short rollers or the like, and cannot address the problems.

An object of the present invention is to provide a thrust roller bearing cage with excellent performance.

Another object of the present invention is to provide a thrust roller bearing cage manufacturing method in which a thrust roller bearing cage with excellent performance can be efficiently manufactured.

Solution to Problem

A thrust roller bearing cage according to the present invention is a cage provided to a thrust roller bearing and having a plurality of pockets that house rollers. The cage includes projections that are formed by bending a radially outer area of the cage inwardly along the radius and that project inwardly along the radius toward a radially outer area of the pockets to make contact with end faces of the rollers. The projections have areas that make contact with the end faces of the rollers, the areas being subjected to a press-flattening process.

Since the areas of the projections making contact with the end faces of the rollers are subjected to the press-flattening process, the chances of oil/lubricant film discontinuity caused by sliding motion of the end faces of the rollers on the contact areas of the projections can be mitigated while the bearing is rotating. This improves the lubricating property in the contact area and alleviates so-called aggression by the rollers against the projections of the cage. Thus, the thrust roller bearing cage configured as above can, reduce the running torque for the bearing and offer excellent performance.

In this disclosure, the press-flattening process is to apply pressure onto the projections in radial expansion directions by utilizing a radially outer face of a mold, which plays a role as a stopper to control an amount of collapse, during a step of bending the radially outer area, and also means smoothing roughness of the surfaces of the projections before and after the process. Specifically, the press-flattening process can smooth a press-sheared surface or a fracture surface formed in an outer-shape forming step (projection forming step) to have a surface roughness Ra (JIS B 0601) of 2 μm or lower.

In addition, engagement portions for alignment purpose that are used when the projections are formed can be provided. In the step of forming the projections, the engagement portions for alignment purpose are used to form the projections in the proper positions. Thus, the projections can be formed accurately. Since the projections are formed by bending a radially outer area of the cage inwardly along the radius, the projections can be properly formed by the engagement portions irrespective of the size of the rollers.

The engagement portions may be pilot holes.

The projections may be formed by bending a radially outer area of the cage obliquely inwardly along the radius.

In another aspect of the present invention, a method for manufacturing a thrust roller bearing cage is a method for manufacturing a cage provided to a thrust roller bearing and having a plurality of pockets that house rollers, and includes a cage-material preparation step of preparing a cage material that will later become the cage, a projection forming step of forming projections in the cage material, the projections projecting inwardly along the radius toward a radially outer area of the pockets and making contact with end faces of the rollers, a pocket forming step of forming the pockets in the cage material, a radially-outer-area bending step of bending a radially outer area of the cage material after the projection forming step and pocket forming step, and a press-flattening step of performing a press-flattening process on areas of the projections formed in the projection forming step, the areas making contact with the end faces of the rollers.

According to the configuration, since the projections, which are formed in the projection forming process, have the areas making contact with the end faces of the rollers that are subjected to the press-flattening process, the chances of oil/lubricant film discontinuity caused by sliding motion of the end faces of the rollers on the contact areas of the projections can be mitigated while the bearing is rotating. This improves the lubricating property in the contact area and alleviates so-called aggression by the rollers against the projections of the cage. Thus, the cage configured as above can reduce the running torque for the bearing and offer excellent performance. Therefore, the method for manufacturing the thrust roller bearing cage can efficiently manufacture a thrust roller bearing cage with excellent performance.

The method for manufacturing the thrust roller bearing cage further includes an engagement-portion forming step of forming engagement portions for alignment purpose in the cage material. In the projection forming step, the projections are formed by utilizing the engagement portions formed in the engagement-portion forming step. In the pocket forming step, the pockets are formed by utilizing the engagement portions formed in the engagement-portion forming step.

According to the configuration, the projections, which extend inwardly along the radius toward a radially outer area of the pockets and make contact with the end faces of the rollers, are formed in the cage material in the projection forming step by utilizing the engagement portions formed in the engagement-portion forming step, and therefore positioning of the projections to be formed can be properly made. Also in the pocket forming step, the pockets are formed in the cage material by utilizing the engagement portions formed in the engagement-portion forming step, and therefore positioning of the pockets to be formed can be properly made. Thus, the projections can be efficiently and accurately formed in terms of the positional relationship between the projections and the pockets to be formed. Since the cage manufactured as described above has projections formed accurately in the proper positions, proper contact between the end faces of the rollers and the projections can be achieved in operation of the bearing.

The engagement-portion forming step can be configured to be a step of forming pilot holes extending through the cage material in the thickness direction of the cage material.

The engagement-portion forming step can be also configured to be a step of forming engagement portions in an area radially inward with respect to the pockets.

The method for manufacturing the thrust roller bearing cage can include a protrusion/indentation forming step of forming protrusions and indentations in the cage material in the thickness direction prior to the engagement-portion forming step.

The protrusion/indentation forming step can include a drawing process performed on the cage material.

The projection forming step can be configured to be a step of pressing the cage material to cut out the outer shape including the projections.

Additionally, the thrust roller bearing cage can be manufactured with a transfer press.

Advantageous Effects of Invention

According to the thrust roller bearing cage as described above, since the areas of the projections making contact with the end faces of the rollers are subjected to the press-flattening process, the chances of oil/lubricant film discontinuity caused by sliding motion of the end faces of the rollers on the contact areas of the projections can be mitigated while the bearing is rotating. This improves the lubricating property in the contact area and alleviates so-called aggression by the rollers against the projections of the cage. Thus, the thrust roller bearing cage configured as above can reduce the running torque for the bearing and offer excellent performance.

According to the method for manufacturing the thrust roller bearing cage as described above, since the projections, which are formed in the projection forming process, have the areas making contact with the end faces of the rollers that are subjected to the press-flattening process, the chances of oil/lubricant film discontinuity caused by sliding motion of the end faces of the rollers on the contact areas of the projections can be mitigated while the bearing is rotating. This improves the lubricating property in the contact area and alleviates so-called aggression by the rollers against the projections of the cage. Thus, the cage configured as above can reduce the running torque for the bearing and offer excellent performance. Therefore, the method for manufacturing the thrust roller bearing cage can efficiently manufacture a thrust roller bearing cage with excellent performance.

DESCRIPTION OF EMBODIMENT

Figure 1:
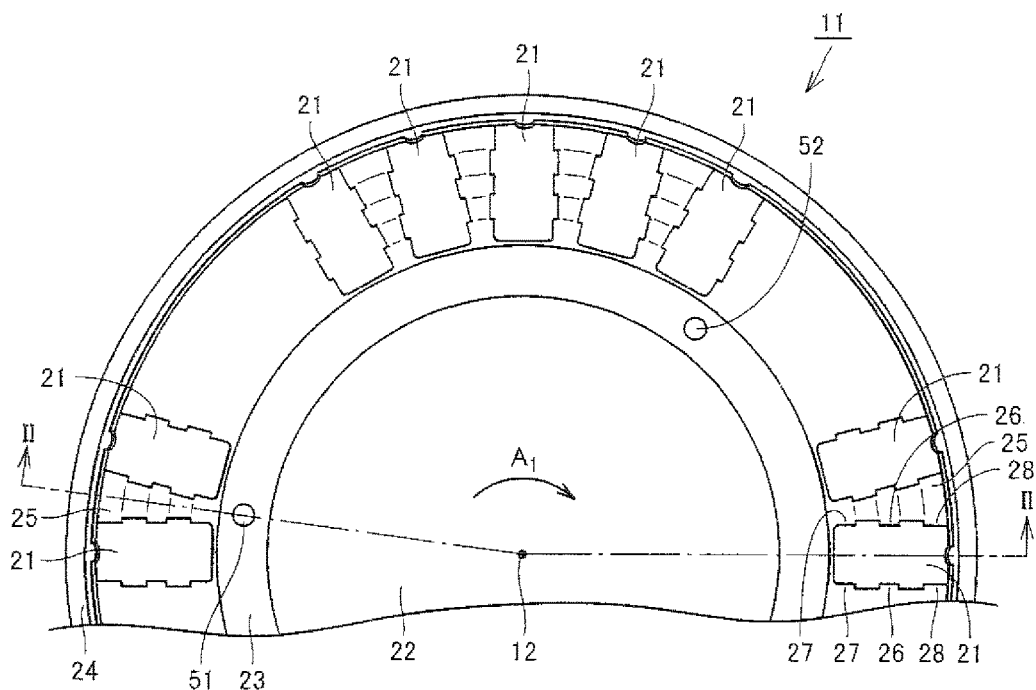
FIG. 1 shows a part of a thrust roller bearing cage according to an embodiment of the present invention.
Figure 2:
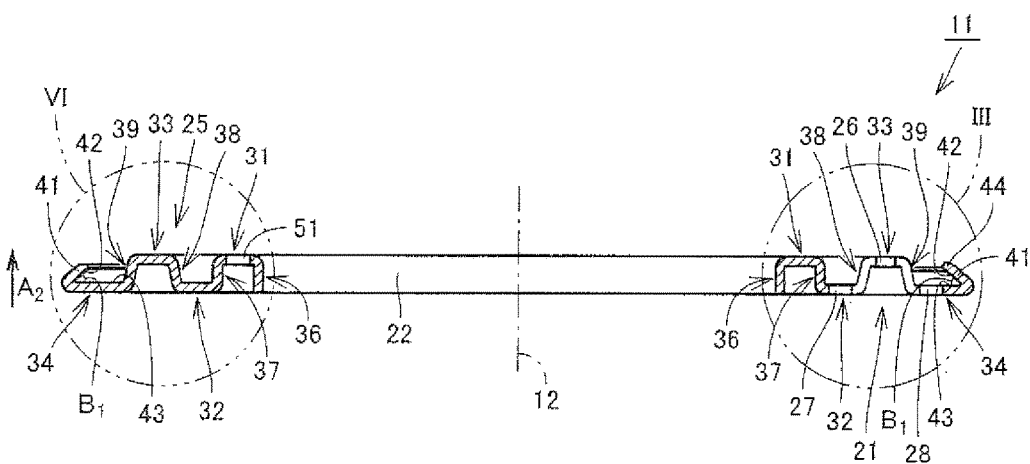
FIG. 2 is a cross-sectional view of the thrust roller bearing cage shown in FIG. 1.
Figure 3:
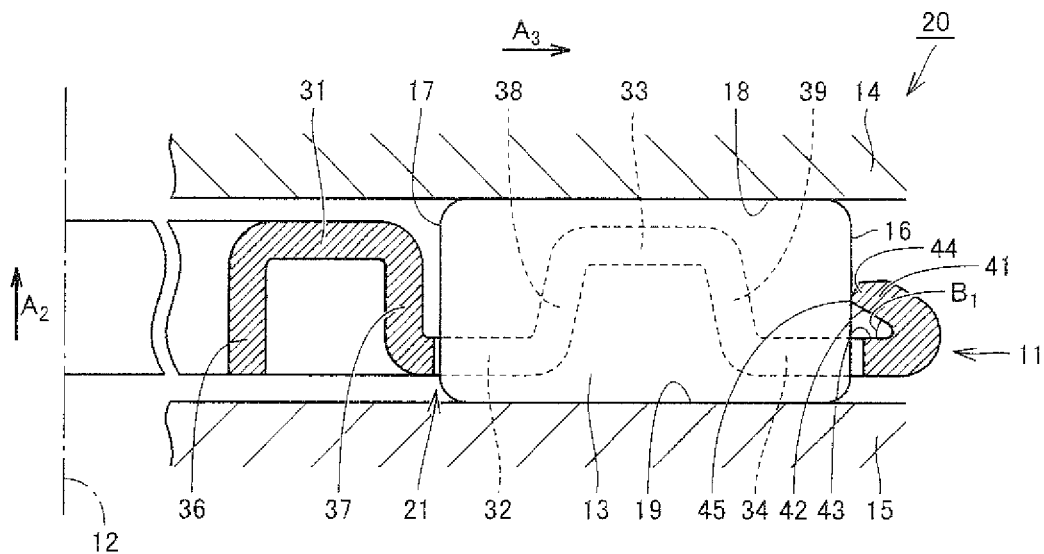
FIG. 3 is an enlarged cross-sectional view showing a part of the thrust roller bearing cage shown in FIG. 2.

With reference to the drawings, embodiments of the present invention will be described below. FIG. 1 shows a part of a thrust roller bearing cage 11 according to an embodiment of the present invention. FIG. 1 shows the cage 11 as viewed in the direction of the rotation axis of the cage 11. FIG. 2 is a cross-sectional view of the thrust roller bearing cage 11 shown in FIG. 1. The cage 11 in FIG. 2 is cut along a cross section indicated by II-II in FIG. 1. Specifically, FIG. 2 shows a cross section where a pocket, which will be described later, is formed on the right side, while showing a cross section where a pillar, which will be described later, is formed on the left side. FIG. 3 is an enlarged cross-sectional view showing a part of the thrust roller bearing cage 11 shown in FIG. 2. The enlarged cross-sectional view in FIG. 3 shows the area indicated by III in FIG. 2. In FIGS. 2 and 3, the rotation axis 12 of the cage 11 is indicated by a dot-and-dash line. In order to provide a clear understanding, FIG. 3 shows a part of needle rollers 13 housed in pockets 21, which will be described later, and a pair of raceways 14, 15 disposed on both sides of the cage 11 in the direction of the rotation axis. The direction of the rotation axis of the cage 11 corresponds to the front-back direction of the paper on which FIG. 1 is drawn and the up-down direction of the paper on which FIGS. 2 and 3 are drawn. The direction indicated by arrow $A_1$ or its opposite direction in FIG. 1 is the circumferential direction. In order to provide a clear understanding, the upper side of FIGS. 2 and 3 is defined as the upper side of the axial direction. In other words, the direction indicated by arrow $A_2$ shown in FIGS. 2 and 3 is the upward direction. In addition, the lateral direction across FIGS. 2 and 3 is defined as the radial direction. The direction indicated by arrow $A_3$ in FIG. 3 is defined as a radially outward direction.

Referring to FIGS. 1 to 3, the configuration of a thrust roller bearing cage 11 according to an embodiment of the invention will be firstly described. The thrust roller bearing cage 11 according to the embodiment of the invention is in the shape of a disk and has a through—bore 22 piercing in a center area thereof straight in the thickness direction of the cage 11. The bore 22 is aligned with the rotation axis (not shown).

The cage 11 includes a pair of ring sections 23, 24, each of which having different diameters, and a plurality of pillars 25 that are provided so as to form pockets 21, which house needle rollers 13, with spacings therebetween in the circumferential direction and couple the ring sections 23, 24. The cage 11 in this example has twenty eight pockets 21 and twenty eight pillars 25, but they are partially shown in the drawing.

The pockets 21 are roughly rectangular as viewed in the axial direction. The pockets 21 are arranged radially about the rotation axis 12 of the cage 11. The pockets 21 have upper roller stoppers 26 and lower roller stoppers 27, 28 on side walls thereof. The upper roller stoppers 26 prevent the needle rollers 13 housed in the pockets 21 from falling out upwardly in the axial direction, while the lower roller stoppers 27, 28 prevent the needle rollers 13 housed in the pockets 21 from falling out downwardly in the axial direction. The upper roller stoppers 26 are provided in the midsection of the pockets 21 in the radial direction. The lower roller stoppers 27 are provided in the radially inner section of the pockets 21, and the lower roller stoppers 28 are provided in the radially outer section of the pockets 21. Each of the upper roller stoppers 26 and lower roller stoppers 27, 28 is provided on both the side walls of the pockets 21 in the circumferential direction so as to project toward the inside of the pockets 21.

The needle rollers 13 are pressed into the pockets 21 to fit in the pockets 21. Each needle roller 13 has end faces, specifically, an end face 16 facing outward of the bearing, and an end face 17 facing inward of the bearing, both of which are flat.

The cage 11 has protrusions and indentations that are made by bending a plate in the plate-thickness direction a few times. More specifically, the cage 11 includes four radially-extending disk portions 31, 32, 33, 34 and four axially-extending cylindrical portions 36, 37, 38, 39.

The four disk portions 31 to 34 are designed to have an inner radius increasing from the radial inside in the order of a first disk portion 31, a second disk portion 32, a third disk portion 33, and a fourth disk portion 34. The four cylindrical portions 36 to 39 are arranged from the radial inside in the order of a first cylindrical portion 36, a second cylindrical portion 37, a third cylindrical portion 38, and a fourth cylindrical portion 39. The first cylindrical portion 36 and second cylindrical portion 37 are designed to extend straight in the axial direction. The third cylindrical portion 38 is designed to slightly incline so that its radially inner part is located axially downward with respect to its radially outer part. On the other hand, the fourth cylindrical portion 39, which is disposed on the radially outermost side, is designed to slightly incline so that its radially inner part is located axially upward with respect to its radially outer part. The upper roller stoppers 26 are provided to the third disk portion 33. The lower roller stoppers 27 are provided to the second disk portion 32, and the lower roller stoppers 28 are provided to the fourth disk portion 34. The aforementioned ring section 23 disposed radially inward includes the first disk portion 31, a part of the second disk portion 32, the first cylindrical portion 36, and the second cylindrical portion 37.

The aforementioned ring section 24 disposed radially outward includes a part of the fourth disk portion 34, a radially outer area bent portion 41, and projections 44. The radially outer area bent portion 41 and projections 44 will be described later. The aforementioned pillars 25 include a part of the second disk portion 32, the third disk portion 33, a part of the fourth disk portion 34, the third cylindrical portion 38, and the fourth cylindrical portion 39.

The cage 11 includes the radially outer area bent portion 41 that is made by bending a radially outer area of the cage 11 inwardly along the radius. In other words, a radially outer area of the cage 11 is bent inwardly along the radius to provide the cage 11 with the radially outer area bent portion 41. The radially outer area bent portion 41 is formed so as to continuously extend into an annular shape. Specifically speaking, the radially outer area bent portion 41 is made by bending a radially outer edge of the fourth disk portion 34, which is disposed on the outermost side along the radius, at a predetermined angle upwardly in the axial direction. The angle of the radially outer area bent portion 41, or more specifically, the angle between a face 42, which is a radially inner surface of the radially outer area bent portion 41, and a face 43, which is an upper surface of the fourth disk portion 34, is indicated by angle $B_1$ in FIGS. 2 and 3, which is an acute angle. Thus, the radially outer area bent portion 41 is formed by bending an area located radially outward with respect to the pockets 21 obliquely inwardly along the radius.

The cage 11 has projections 44 that are provided in the radially outer area bent portion 41 in alignment with the pockets 21. Specifically, the outer circumferential edges of the projections 44 (inner circumferential edge of the radially outer area bent portion 41 except for the projections 44) overlap the outer circumferential edges of the pockets 21. The projections 44 project inwardly along the radius toward a radially outer area of the pockets 21 to make contact with the end faces 16 of the needle rollers 13 housed in the pockets 21. Specifically speaking, the projections 44 are inwardly extending edge parts of the radially outer area bent portion 41. The projections 44 are formed along the circumferential direction so that the tips of the projections 44 are aligned with the circumferentially center of the pockets 21. Each projection 44 has a corner 45 on the face 42, which is a radially most inward part of the projection 44 (or a corner 45 located radially most inward of the projection 44). The projections 44 are formed so that the corners 45 make contact with the center of the end faces 16 of needle rollers 13 housed in the pockets 21. The corner 45 in the example is a corner of the projection 44, located near the fourth disk portion 34.

The cage 11 is provided with three pilot holes 51, 52. The three pilot holes 51, 52 serve as engagement portions for alignment purpose. Note that one of the pilot holes is omitted in FIG. 1. The three pilot holes 51, 52 are spaced in the circumferential direction and extend through the cage 11 straightly in the thickness direction. The three pilot holes 51, 52 open in a circular shape. The three pilot holes 51, 52 are roughly equidistantly spaced, and specifically in this example, the three pilot holes 51, 52 are spaced every 120 degrees around the rotation axis 12 of the cage 11. More specifically, the pilot holes 51, 52 are formed in the radially center of the first disk portion 31, which is located radially most inward of the cage 11. The diameter of the pilot holes 51, 52 is selected from, for example, φ2.5 mm and φ3 mm.

The above-described cage 11 is provided in a thrust roller bearing 20 that includes, for example, a plurality of needle rollers 13, a raceway 14 on the upper side, and a raceway 15 on the lower side. In operation of the thrust roller bearing 20, the needle rollers 13 housed in the pockets 21 roll on a raceway surface 18 of the raceway 14 located on the axially upper side and on a raceway surface 19 of the raceway 15 located on the axially lower side. The cage 11 rotates on its rotation axis 12. Each of the needle rollers 13 housed in the pockets 21 makes rotational motion around its axis while making orbital motion. The motion exerts an outward centrifugal force on the needle rollers 13. A center part of the end face 16 of each needle roller 13 makes sliding contact with each projection 44 formed in the cage 11, or more specifically, with the corner 45 located radially most inward of the projection 44 of the cage 11. In short, the corners 45 of the projections 44 are areas that make contact with the end faces 16 of the needle rollers 13.

The corners 45 are press-flattened. A press-flattening process removes sharp-pointed parts from the corners 45 and smoothly connects faces forming the corners 45. This alleviates aggression against objects with which the corners 45 make contact.

According to the cage 11 configured as described above, the projections 44 can be formed at proper positions by using the pilot holes 51, 52, which serve as engagement portions for alignment purpose, prior to formation of the projections 44. Thus, accurate formation of the projections 44 can be achieved. Since the projections 44 are formed by inwardly bending the radially outer area of the cage 11, the projections 44 can be properly formed irrespective of the size of the rollers. In addition, the corners 45, which are areas of the projections 44 making contact with the end faces 16 of the needle rollers 13, are press-flattened, and therefore the chances of oil/lubricant film discontinuity caused by sliding motion of the end faces 16 of the needle rollers 13 on the corners 45, which are areas of the projections 44 making contact with the end faces 16 of the needle rollers 13, can be mitigated while the bearing is rotating. This improves the lubricating property in the contact areas and alleviates so-called aggression by the needle rollers 13 against the projections 44 of the cage 11. Thus, the thrust roller bearing cage 11 configured as above can reduce the running torque for the bearing and offer excellent performance.

Figure 4:
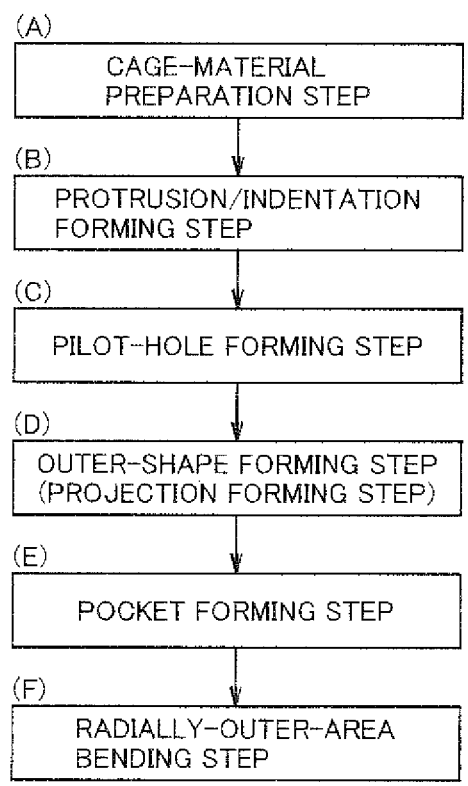
FIG. 4 is a flowchart showing representative steps of a method for manufacturing the thrust roller bearing cage according to the embodiment of the present invention.

Next, a method for manufacturing the thrust roller bearing cage 11 according to the embodiment of the present invention will be described. The thrust roller bearing cage 11 is manufactured by using a transfer press. The transfer press is a relatively inexpensive press machine with less structural complexity. FIG. 4 is a flowchart showing representative steps of the method for manufacturing the thrust roller bearing cage 11 according to the embodiment of the present invention.

Referring to FIG. 4, the first thing to do is to prepare a cage material, which will later become a cage 11 (cage-material preparation step) (FIG. 4(A)). The cage material is, for example, a thin flat steel plate. At this stage, the cage material may be a plate roughly cut into a rectangle or, of course, a circle, because the final outer shape of the cage is attained in an outer-shape forming step which will be performed later.

Figure 5:
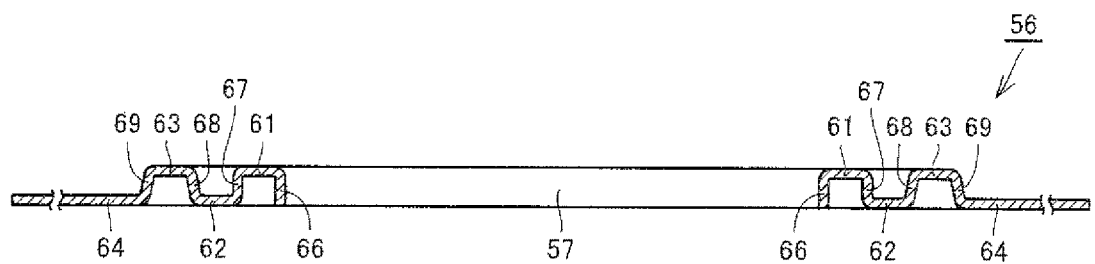
FIG. 5 is a cross-sectional view of a cage material after having undergone a protrusion/indentation forming step.

Next, protrusions and indentations are formed in the cage material in the thickness direction of the cage material (protrusion/indentation forming step) (FIG. 4(B)). In this step, the cage material is subjected to a drawing process. FIG. 5 is a cross-sectional view of the cage material after having undergone the protrusion/indentation forming step. The cross section shown in FIG. 5 corresponds to the cross section shown in FIG. 2. Referring to FIG. 5, the flat-plate cage material 56 is subjected to a drawing process to form the first to fourth disk portions 61, 62, 63, 64 and the first to fourth cylindrical portions 66, 67, 68, 69. Then, a circular bore 57 is formed at the center of the cage material so as to extend therethrough in the thickness direction. Thus, the cage material 56 in this step has a so-called mountain-and-valley shape made by bending itself several times in the axial direction.

Figure 6:
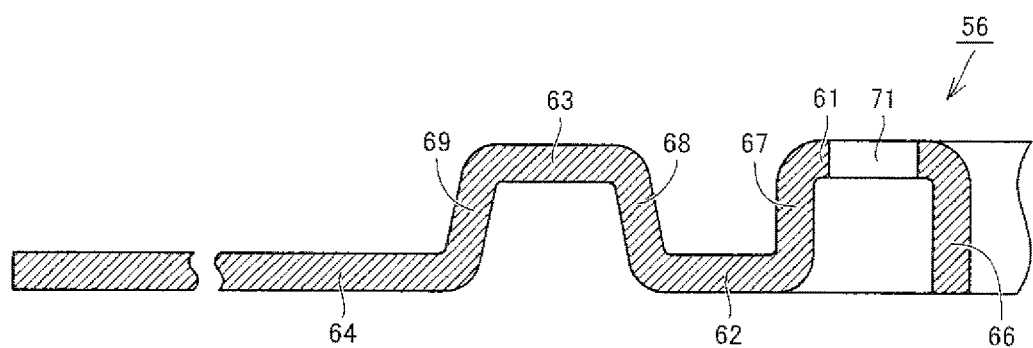
FIG. 6 is an enlarged cross-sectional view showing a part of the cage material after having undergone a pilot-hole forming step in an enlarged scale.

Next, pilot holes serving as engagement portions are formed (pilot-hole forming step (engagement-portion forming step)) (FIG. 4(C)). FIG. 6 is an enlarged cross-sectional view showing a part of the cage material 56 after having undergone the pilot-hole forming step, in an enlarged scale. The cross section shown in FIG. 6 corresponds to the area VI in FIG. 2. A pilot hole 71 serving as an engagement portion is formed at the radially center of the first disk portion 61 so as to straightly extend through the first disk portion 61 in the thickness direction. The pilot hole 71 is provided at three positions in total almost evenly spaced every 120 degrees in the circumferential direction.

Figure 7:
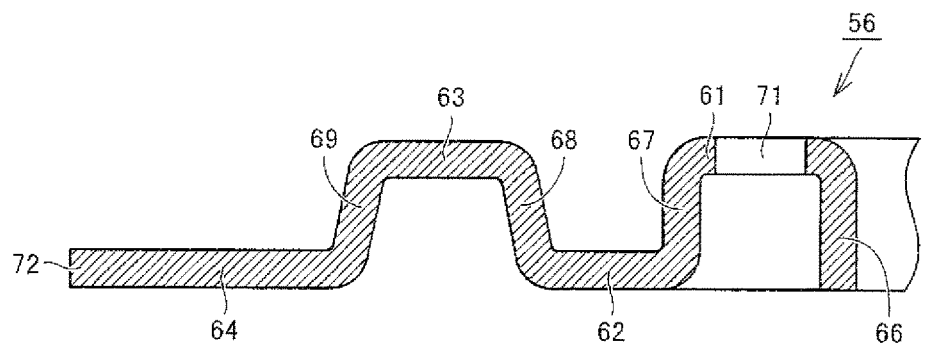
FIG. 7 is an enlarged cross-sectional view showing a part of the cage material after having undergone an outer-shape forming step in an enlarged scale.

Subsequently, the outer shape of the cage material 56 is formed (outer-shape forming step) (FIG. 4(D)). FIG. 7 is an enlarged cross-sectional view showing a part of the cage material 56 after having undergone the outer-shape forming step in an enlarged scale. The cross section shown in FIG. 7 corresponds to the area VI shown in FIG. 2, and is taken along a cross section indicated by VII-VII in FIG. 8. In this step, specifically, the cage material 56 is pressed straight in the thickness direction to cut it out so that the cage 11 takes the final outer shape after the cage 11 is subjected to a radially-outer-area bending step and other subsequent steps, which will be performed later. Through the step, an edge 72 located on the radially outer side of the cage 11, more specifically, an edge 72 located radially outer side of the fourth disk portion 64 is formed.

Figure 8:
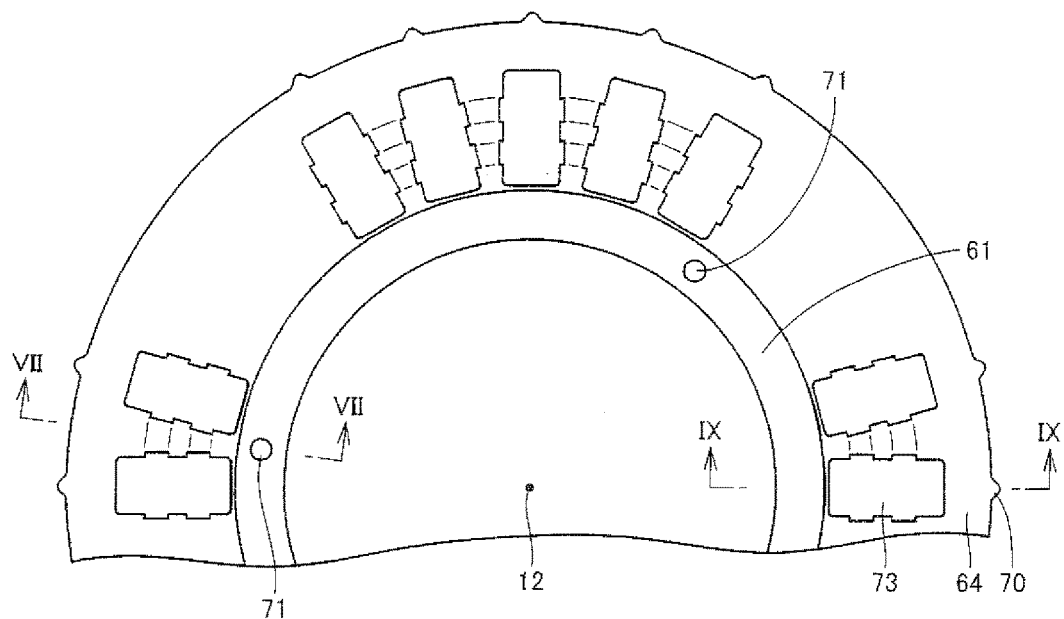
FIG. 8 shows a part of the cage material after having undergone a pocket forming step.

Upon forming the outer shape, the cage material 56 is pressed so as to leave some areas that will later become projections 70. Therefore, the outer-shape forming step in this case is also a projection forming step of forming the projections. FIG. 8 illustrates a part of the cage material 56 after having undergone a pocket forming step, which is performed subsequent to the outer-shape forming step. FIG. 8 corresponds to FIG. 1. Prior to pressing for formation of the projections 70, the cage material 56 is put in place in the circumferential direction by utilizing the plurality of pilot holes 71. Specifically speaking, a plurality of guide pins (not shown), which serve as locating jigs having a pointed end and gradually increasing in diameter like a pencil, are prepared, and are gradually inserted from one side into the pilot holes 71 in the thickness direction. After the alignment of the cage material 56 is made using the guide pins to check the positions and the shape of the projections 70, the entire outer shape is cut out from the cage material 56 by a press (not shown). Even if the cage material 56 on the press is slightly out of alignment with a proper position where the projections 70 are formed accurately, gradual insertion of the sharp-pointed pencil-like guide pins into the pilot holes 71 moves the cage material 56 to the proper position where the projections 70 can be formed at proper positions with respect to the press, thereby pressing the cage material in the proper position. In this example, the three pilot holes 71 thus provided prevent the cage material 56 from rotating or making other movements during alignment operation, thereby putting the cage material 56 in place more accurately.

Figure 9:
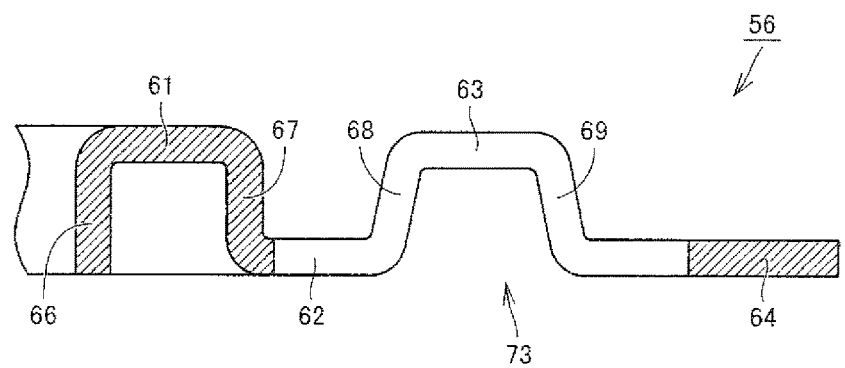
FIG. 9 is an enlarged cross-sectional view showing a part of the cage material after having undergone the pocket forming step in an enlarged scale.

Next, pockets are formed (pocket forming step) (FIG. 4(E)). FIG. 9 is an enlarged cross-sectional view showing a part of the cage material after having undergone the pocket forming step in an enlarged scale. The cross section shown in FIG. 9 corresponds to the area III shown in FIG. 2, and is taken along a plane IX-IX in FIG. 8. The pocket 73 is formed by punching a hole across a part of the second disk portion 62, the third disk portion 63, and a part of the fourth disk portion 64, and also across the third cylindrical portion 68 and fourth cylindrical portion 69 so as to straightly extend through the cage material 56 in the thickness direction. Although it is not illustrated in FIG. 9, the upper roller stoppers and lower roller stoppers, which are shaped so as to project toward the inside of the pockets 73 in the circumferential direction, are formed at the same time together with the pockets 73. Thus, the pockets 73 are punched out to conform the outer shape of needle rollers 13 to be housed in the pockets 73 in consideration of the shape of the upper roller stoppers and lower roller stoppers. These pockets 73 can be punched out all together or one by one.

For forming the pockets 73 in the cage material 56, the pilot holes 71 are also used to align a press (not shown) for punching out the pockets with the cage material 56 to be punched. That is, the pockets 73 are formed with respect to the positions of the pilot holes 71. As with the case of the outer-shape forming step, circumferential positioning is performed with the use of the plurality of pilot holes 71. Specifically speaking, a plurality of guide pins serving as sharp-pointed pencil-like locating jigs are prepared and gradually inserted into the pilot holes 71 from one side in the thickness direction as described above. After the alignment of the cage material 56 is made using the guide pins to check the positions and the shape of the pockets 73, the pockets 73 are pressed to be punched. The pockets 73 thus provided are placed circumferentially in phase with the projections 70, and a suitable positional relationship can be established between the formed pockets 73 and the formed projections 70. These pockets 73 can be punched out all together or one by one.

The positions of the pockets 73 are out of alignment with the pilot holes 71 in the circumferential direction in this example; however, the positional relationship of the pockets 73 with the pilot holes 71 can be determined as desired. Specifically, the pockets 73 in this example are formed so that each of the pilot holes 71 is aligned with a circumferential center between adjacent pockets 73.

Figure 10:
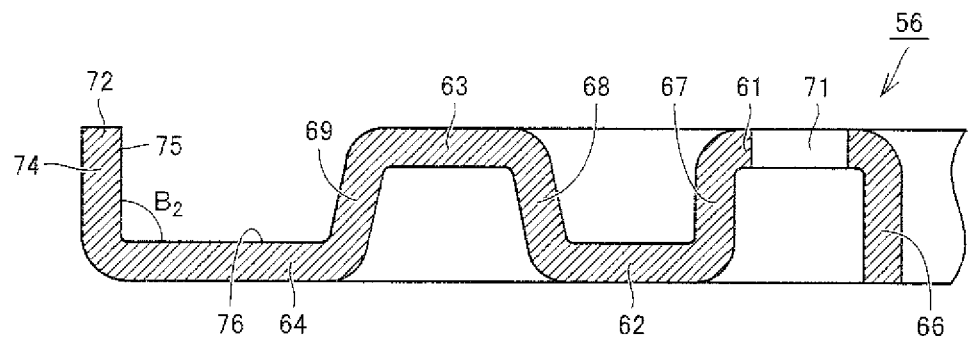
FIG. 10 is an enlarged cross-sectional view showing a part of the cage material in the middle of a radially-outerarea bending step in an enlarged scale.
Figure 11:
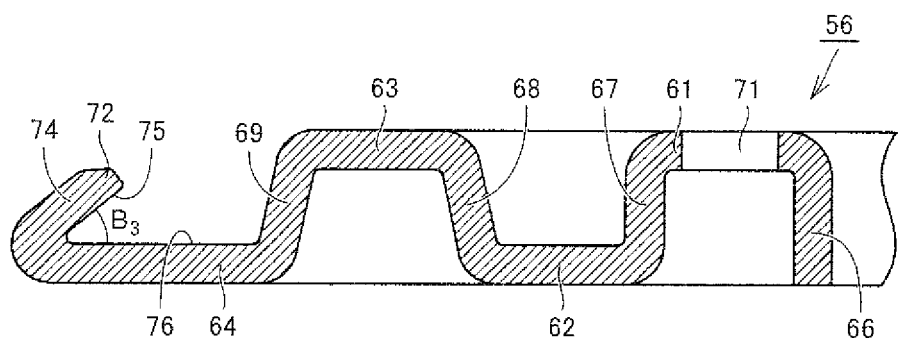
FIG. 11 is an enlarged cross-sectional view showing a part of the cage material after having undergone the radially-outer-area bending step in an enlarged scale.
Figure 12:
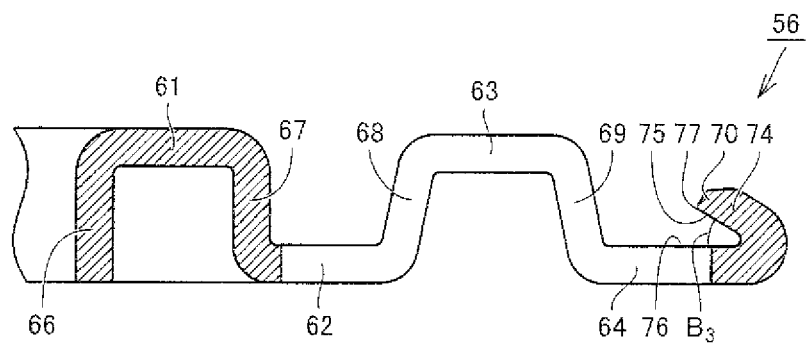
FIG. 12 is an enlarged cross-sectional view showing a part of the cage material after having undergone the radially-outer-area bending step in an enlarged scale.
Figure 15:
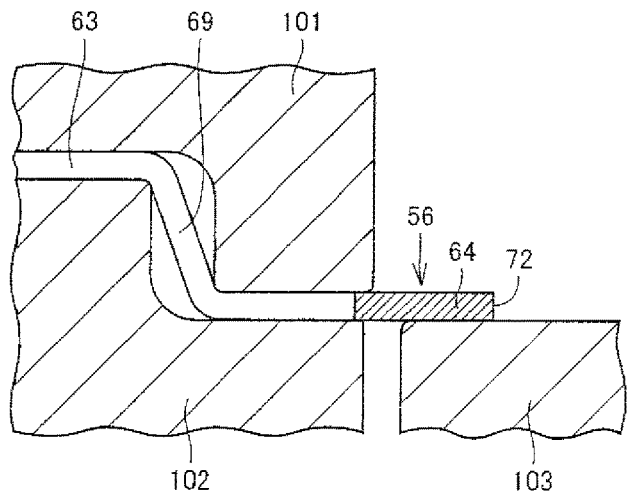
FIG. 15 is an enlarged cross-sectional view showing a state in the radially-outer-area bending step.
Figure 16:
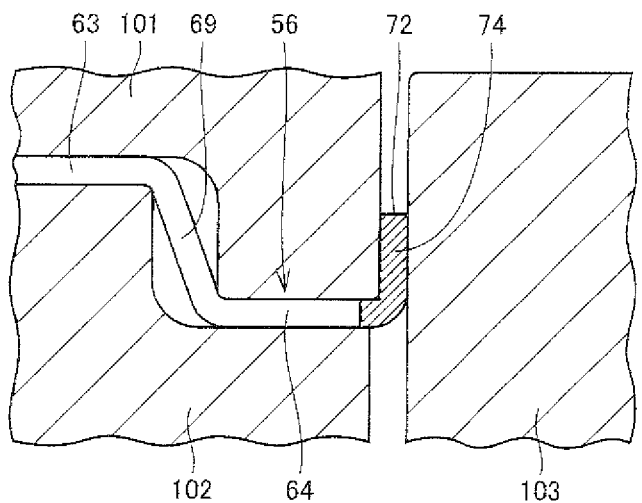
FIG. 16 is an enlarged cross-sectional view showing a state in the radially-outer-area bending step.

Next, a radially outer area of the cage material 56 is bent inwardly along the radius (radially-outer-area bending step) (FIG. 4(F)). FIG. 10 is an enlarged cross-sectional view showing a part of the cage material in the middle of the radially-outer-area bending step in an enlarged scale. FIGS. 11 and 12 are enlarged cross-sectional views each showing a part of the cage material 56 after having undergone the radially-outer-area bending step in an enlarged scale. The cross sections shown in FIGS. 10 and 11 correspond to the area VI in FIG. 2. The cross section shown in FIG. 12 corresponds to the area III in FIG. 2. As shown in FIG. 10, a ring-shaped, radially outer edge 72 of the cage material 56 is entirely bent once straight in the thickness direction. Consequently, a face 75, which is a radially inner surface of a radially outer area bent portion 74, forms an angle $B_2$ with a face 76, which is an upper surface of the fourth disk portion 64, the angle $B_2$ being almost a right angle. The method for bending the edge at a right angle is not particularly limited, but includes the following for example. FIGS. 15 and 16 are enlarged cross-sectional views each showing a state in the radially-outer-area bending step. As shown in FIG. 15, the whole area of the cage material 56 except for a radially outer area of the fourth disk portion 64 is sandwiched between holding members 101 and 102 from above and below and is held therebetween, and a pressurizing member 103 is placed under the radially outer area of the fourth disk portion 64. As shown in FIG. 16, lifting up the pressurizing member 103 upward can bend the radially outer area bent portion 74 at a right angle with respect to the fourth disk portion 64.

Subsequently, as shown in FIGS. 11 and 12, the radially outer area bent portion 74 is bent inwardly along the radius, thereby forming an inwardly inclined radially outer area bent portion 74. The bending angle, more specifically, an angle between the face 75, which is a radially inner surface of the radially outer area bent portion 74, and a face 76, which is an upper surface of the fourth disk portion 64, is indicated by an angle $B_3$ in FIGS. 11 and 12. The angle $B_3$ corresponds to the aforementioned angle $B_1$. In other words, the angle $B_1$ and angle Bs are equal to each other.

In the positional relationship in the circumferential direction, the projections 70 are aligned with the circumferential center of the pockets 73, and therefore it can be said that the projections 70 are formed at proper positions. Specifically, the projections 70 have corners 77 located near the fourth disk portion 76, and the corners 77 abut against center parts of end faces 16 of needle rollers 13. At last, the areas of the projections 70 that make contact with the end faces 16 of the needle rollers 13 undergo a press-flattening process. Through these steps, the thrust roller bearing cage 11 configured as shown in FIGS. 1 to 3 is manufactured.

Figure 17:
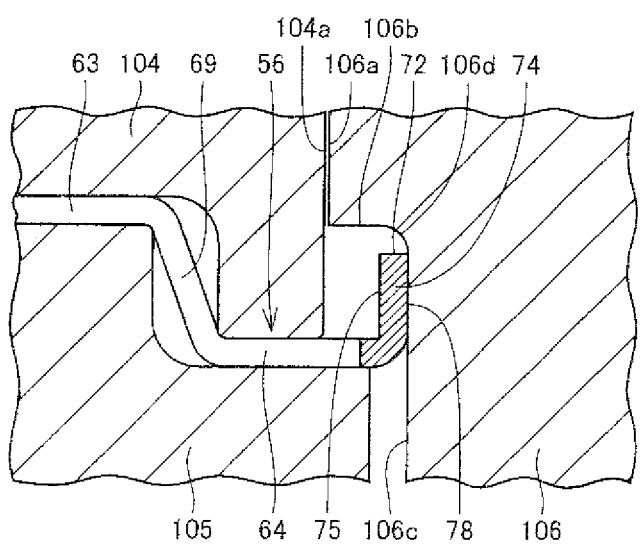
FIG. 17 is an enlarged cross-sectional view showing a state in the radially-outer-area bending step.
Figure 18:
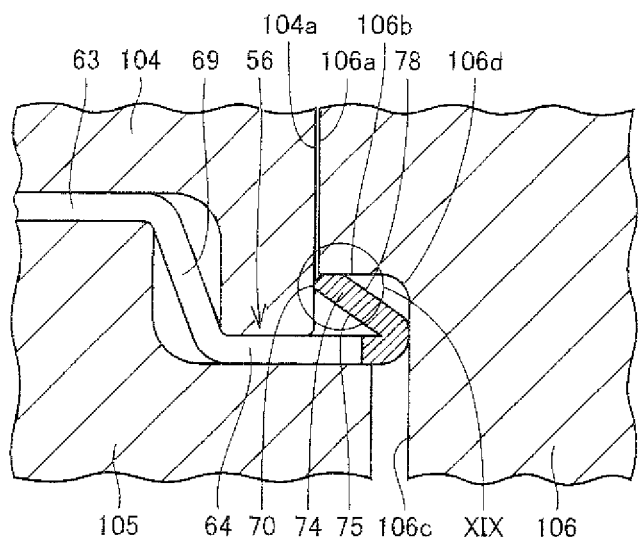
FIG. 18 is an enlarged cross-sectional view showing a state in a press-flattening step.
Figure 19:
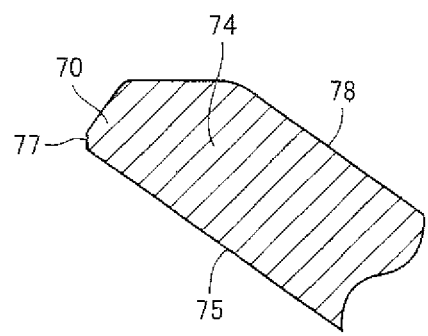
FIG. 19 is an enlarged cross-sectional view showing a tip of a radially outer area bent portion after having undergone the press-flattening step in an enlarged scale.

Alternatively, the step for the press-flattening process can be performed continuously with a step of inwardly bending the cage material 56 with the ring-shaped radially outer edge 72 bent straight in the thickness direction. FIG. 17 is an enlarged cross-sectional view showing a state in the radially-outer-area bending step. FIG. 18 is an enlarged cross-sectional view showing a state in the press-flattening step. FIG. 19 is an enlarged cross-sectional view showing the tip of the radially outer area bent portion after having undergone the press-flattening step in an enlarged scale. Specifically speaking, as shown in FIG. 17, the cage material 56 with the radially outer area bent portion 74 bent at a right angle with respect to the fourth disk portion 64 is prepared, and an area of the cage material 56 located radially inward with respect to the radially outer area bent portion 74 is sandwiched between molds 104 and 105 from above and below and is held therebetween. At this stage, a radially outer side edge of the upper mold 104 is located radially inward with respect to a radially outer side edge of the lower mold 105. Then, a mold 106 that applies downward pressure on the radially outer area bent portion 74 from above is placed so as to make contact with a radially outer face 78 of the radially outer area bent portion 74. The mold 106 includes a radially inner end face 106a that faces the upper mold 104 and extends in the vertical direction, a horizontal face 106b that continuously extends from the radially inner end face 106a outwardly along the radius, and a radially inner side face 106c that faces the radially outer face 78 of the radially outer area bent portion 74 and extends in the vertical direction, and a part 106d at the intersection of the horizontal face 106b and radially inner side face 106c is rounded (R). When the mold 106 is moved downward so that the radially inner end face 106a moves along a radially outer end face 104a of the mold 104, the radially outer area bent portion 74 can be bent obliquely inwardly along the radius as guided by the rounded face part 106d. Subsequently, as shown in FIG. 18, while mold 104 is further moved down, the mold 104 smooths a corner, which is a radially inner part of the radially outer area bent portion 74, and the mold 106 smooths a corner, which is a radially outer part of the radially outer area bent portion 74. As shown in FIG. 19, this step can provide a projection 70 having a press-flattened area that makes contact with an end face of a roller.

According to the configuration, since the pilot holes 71, which are formed in the pilot-hole forming step, are utilized to form the projections 70, which project inwardly along the radius toward the radially outer areas of the pockets 73 and make contact with the end faces of the rollers, in the cage material during the projection forming step, proper positioning of the projections 70 can be achieved. Also, since the pilot holes 71 formed in the pilot-hole forming step is utilized to form the pockets 73 in the cage material 56 during the pocket forming step, proper positioning of the pockets 73 can be achieved. Thus, the projections 70 can be efficiently and accurately formed in the positional relationship between the projections 70 and the pockets 73. Since the cage 11 manufactured as described above has projections 44 formed in place accurately, proper contact between the end faces 16 of the needle rollers 13 and the projections 44 can be achieved in operation of the bearing. In this case, the corners 45 of the projections 44, which are formed in the projection forming step, making contact with the end faces 16 of the needle rollers 13, are press-flattened, and therefore the chances of oil/lubricant film discontinuity caused by sliding motion of the end faces 16 of the needle rollers 13 on the corners 45 of the projections 44, making contact with the end faces 16 of the needle rollers 13, can be mitigated while the bearing is rotating. This improves the lubricating property in the contact areas and alleviates so-called aggression by the needle rollers 13 against the projections 44 of the cage 11. Thus, the cage configured as above can reduce the running torque for the bearing and offer excellent performance. Therefore, the method for manufacturing the thrust roller bearing cage 11 can efficiently manufacture a thrust roller bearing cage 11 with excellent performance.

In this method, since the pilot-hole forming step is a step of forming the pilot holes 71 in an area located radially inward with respect to the pockets 73, the space of the cage 11 can be effectively used to form the pilot holes 71.

In this method, since the pilot-hole forming step is a step of forming the pilot holes in the circumferential direction out of alignment with the pockets 73, the cage 11 can avoid local strength reduction in the circumferential direction.

In addition, this manufacturing method includes the protrusion/indentation forming step of forming protrusions and indentations in the cage material 56 in the thickness direction prior to the pocket forming step. Even though the cage 11 is a thin plate, the length of the cage 11 in the direction of the rotation axis can be secured largely, and therefore the rollers can be held properly.

In this method, since the protrusion/indentation forming step in this embodiment performs a drawing process on the cage material 56, the protrusions and indentations can be formed efficiently.

Also in this method, since the cage material 56 is pressed to cut out its outer shape in the outer-shape forming step, the outer shape of the cage material 56 can be relatively easily and accurately formed.

As described above, the method for manufacturing the thrust roller bearing cage 11 can efficiently manufacture a thrust roller bearing cage with excellent performance.

Figure 13:
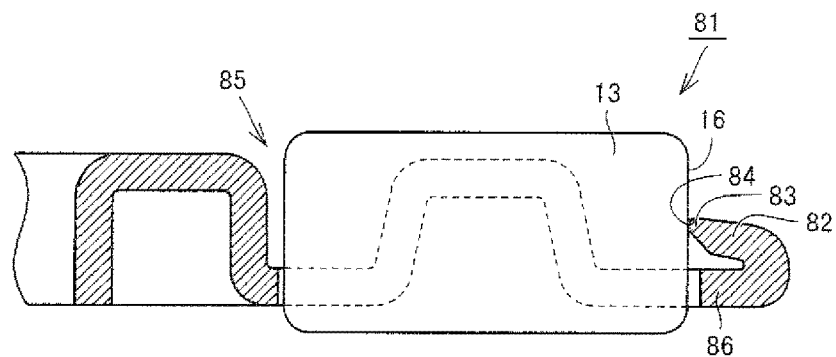
FIG. 13 is a cross-sectional view showing a part of a thrust roller bearing cage according to another embodiment of the present invention.

Although the corners of the projections located near the fourth disk portion are designed to make contact with the centers of the end faces of the needle rollers in the above-described embodiment, the following configuration may also be available. FIG. 13 is a cross-sectional view showing a part of the cage configured as follows. FIG. 13 corresponds to the cross section shown in FIG. 3.

Referring to FIG. 13, a thrust roller bearing cage 81 according to another embodiment of the present invention has a radially outer area bent portion 82 with a projection 83 at a position where a pocket 85 is formed. The projection 83 has a corner 84 located opposite to the fourth disk portion 86, and the corner 84 is designed to make contact with the center of an end face 16 of a needle roller 13 housed in the pocket 85. The corner 84 is press-flattened. This configuration can be achieved by machining the corner 84 with a jig having an angle suitable for the corner 84 during the radially-outer-area bending step.

Figure 14:
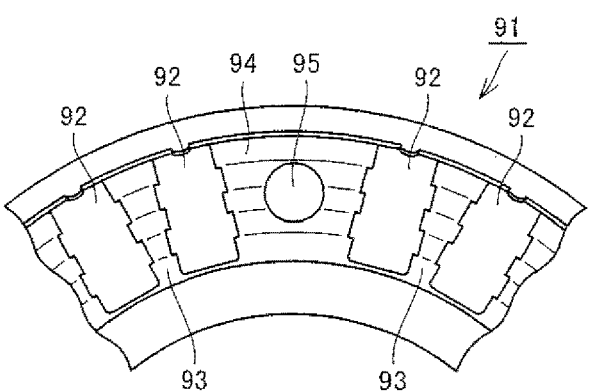
FIG. 14 shows a part of a thrust roller bearing cage according to yet another embodiment of the present invention.

The pilot holes can be provided at positions for the pockets. In other words, one of the plurality of pockets can be used as a pilot hole. FIG. 14 shows a part of a cage configured as above. Referring to FIG. 14, a thrust roller bearing cage 91 according to yet another embodiment of the present invention includes a plurality of pockets 92 and pillars 93 situated between two adjacent pockets 92. A pilot hole 95 is formed at a position, where a pocket 92 is supposed to be formed, in a pillar 94 between a pocket 92 and a pocket 92. It can be said that one of the pockets 92, which are equidistantly provided in the circumferential direction, is replaced with a pilot hole 95.

Although the pilot holes in the embodiments are designed to straightly extend through the cage in the thickness direction, the present invention is not limited thereto, and the pilot holes may be designed to have a tapered wall surface through the cage. In addition, the opening of the pilot holes can be in the shape of a rectangle, triangle, or other shapes instead of a circle. Although the pilot holes are provided as engagement portions, the present invention is not limited thereto, and the engagement portions can be implemented differently, for example, by notches.

Although a drawing process is performed in the protrusion/indentation forming step in the above-described embodiments, the present invention is not limited thereto, and a metalworking process other than the drawing process, for example a bending process, can be used to form protrusions and indentations.

Although the cage is designed to have the protrusions and indentations in the thickness direction in the above-described embodiments, the present invention is not limited thereto, and the cage can be made of so-called two bonded plates without protrusions and indentations formed in the thickness direction.

In the above-described embodiments, the thrust roller bearing equipped with the aforementioned cages can be configured not to have raceways. Furthermore, rollers other than the needle rollers, for example rod-like rollers, can be used.

The foregoing has described the embodiments of the present invention by referring to the drawings. However, the invention should not be limited to the illustrated embodiments. It should be appreciated that various modifications and changes can be made to the illustrated embodiments within the scope of the appended claims and their equivalents.

Industrial Applicability

The thrust roller bearing cage and the method for manufacturing the cage according to the present invention are effectively utilized to meet demands for a thrust roller bearing cage with excellent performance and an efficient method for manufacturing the thrust roller bearing cage.

REFERENCE SIGNS LIST 11, 81, 91 cage
12 rotation axis
13 needle roller
14, 15 raceway
16, 17 end face
18, 19 raceway surface
20 thrust roller bearing
21, 73, 85, 92 pocket
22, 57 bore
23, 24 ring section
25, 93, 94 pillar
26, 27, 28 roller stopper
31, 32, 33, 34, 61, 62, 63, 64, 86 disk portion
36, 37, 38, 39, 66, 67, 68, 69 cylindrical portion
41, 74, 82 radially outer area bent portion
42, 43, 75, 76, 78 face
44, 70, 83 projection
45, 77, 84 corner
51, 52, 71, 95 pilot hole
56 cage material
72 edge
101, 102 holding member
103 pressurizing member
104, 105, 106 mold
104a radially outer end face
106a radially inner end face
106b horizontal face
106c radially inner side face
106d part

The invention claimed is:

1. A thrust roller bearing cage provided in a thrust roller bearing and including a plurality of pockets housing rollers, comprising:
   projections that are formed by bending a radially outer area of the cage inwardly along a radius, and project inwardly along the radius at a radially outer area of the pockets
   pilot holes extending straight through the cage in a thickness direction and serving as engagement portions for alignment purposes that are used when the projections are formed, and
   a through-bore piercing in a center area of the thrust roller bearing cage;
   wherein the pilot holes are arranged radially on an outer side of the through-bore, outer circumferential edges of the projections overlap outer circumferential edges of the pockets, and
   a flat area is formed at a radially most inward part of each projection so that the flat area of each projection makes contact with an end face of the roller housed in a respective pocket.

2. The thrust roller bearing cage according to claim 1, wherein the projections are formed by bending the radially outer area of the cage obliquely inwardly along the radius.

3. A method for manufacturing a thrust roller bearing cage provided in a thrust roller bearing and including a plurality of pockets housing rollers, comprising the steps of:
   preparing a cage material that will later become the thrust roller bearing cage;
   forming engagement portions for alignment purpose in the cage material;

positioning the cage material using guide pins serving as locating jigs by engaging the engagement portions;

forming projections in the cage material, the projections projecting outwardly along a radius in a radially outer area that is radially outward of the pockets;

forming pockets in the cage material, the guide pins also serving as locating jigs by engaging the engagement portions during the step of forming the pockets;

bending the radially outer area of the cage material inwardly for the projections to make contact with end faces of the rollers after the step of forming the projections and the step of forming the pockets; and press-flattening areas of the projections formed in the step of forming the projections, the areas making contact with the end faces of the rollers.

4. The method for manufacturing the thrust roller bearing cage according to claim 3, wherein
the step of forming the engagement portions is a step of forming pilot holes that extend through the cage material in a thickness direction of the cage material.

5. The method for manufacturing the thrust roller bearing cage according to claim 3, wherein
the step of forming the engagement portions is a step of forming the engagement portions in an area radially inward with respect to the pockets.

6. The method for manufacturing the thrust roller bearing cage according to claim 3, further comprising the step of:
forming protrusions and indentations in the cage material in the thickness direction.

7. The method for manufacturing the thrust roller bearing cage according to claim 6, wherein
the step of forming the protrusions and indentations includes a drawing process performed on the cage material.

8. The method for manufacturing the thrust roller bearing cage according to claim 3, wherein
the step of forming the projections is a step of pressing the cage material to cut out an outer shape including the projections.

9. The method for manufacturing the thrust roller bearing cage according to claim 3, wherein
the cage is manufactured with a transfer press.

* * * * *